United States Patent [19]

Sorber

[11] Patent Number: 4,564,504
[45] Date of Patent: Jan. 14, 1986

[54] APPARATUS FOR PRODUCING AN ACID COMPOUND

[75] Inventor: Kenneth H. Sorber, Atlanta, Nebr.

[73] Assignee: Sorco Corporation, Odessa, Nebr.

[21] Appl. No.: 556,091

[22] Filed: Nov. 29, 1983

[51] Int. Cl.$^4$ .................. B01J 14/00; B01J 19/02; C01C 1/242; F28D 7/00

[52] U.S. Cl. ........................... 422/189; 165/82; 366/338; 422/201; 422/225; 422/235; 423/549

[58] Field of Search ............ 423/549, 578, 522, 545, 423/550; 422/189, 193, 194, 201, 205, 225, 235, 224; 366/336-338; 165/81, 82, 174

[56] References Cited

U.S. PATENT DOCUMENTS

| | | | |
|---|---|---|---|
| 1,892,778 | 1/1933 | Black | 165/82 |
| 1,988,701 | 1/1935 | Pyzel | 423/549 |
| 2,409,790 | 10/1946 | Otto | 423/550 X |
| 2,659,659 | 11/1953 | Shmidl | 423/549 |
| 2,902,342 | 9/1959 | Kerley | 423/550 X |
| 2,986,454 | 5/1961 | Jewett | 422/205 X |
| 3,035,899 | 5/1962 | Wilson | 423/549 |
| 3,186,792 | 6/1965 | Gerrard | 423/550 |
| 3,196,943 | 7/1965 | Haerter | 165/174 |
| 3,219,483 | 11/1965 | Goos et al. | 366/337 X |
| 3,279,532 | 10/1966 | Pfeil | 165/81 |
| 3,492,087 | 1/1970 | MacGregor et al. | 422/189 X |
| 3,507,626 | 4/1970 | Van Horn | 366/336 X |
| 3,895,010 | 7/1975 | Cowley | 422/235 X |
| 4,121,656 | 10/1978 | Huber | 165/174 X |
| 4,154,897 | 5/1979 | Shimogori et al. | 422/241 X |
| 4,164,541 | 8/1979 | Platz et al. | 422/205 X |
| 4,179,222 | 12/1979 | Strom et al. | 366/337 |
| 4,208,375 | 6/1980 | Bard | 422/225 |
| 4,224,142 | 9/1980 | Benedict | 423/549 X |
| 4,250,160 | 2/1981 | Eakman | 423/545 X |
| 4,251,227 | 2/1981 | Othmor | 423/551 X |
| 4,261,963 | 4/1981 | Münster | 423/388 |
| 4,308,049 | 12/1981 | Mini | 423/549 X |
| 4,360,057 | 11/1982 | Koump | 165/82 |
| 4,370,304 | 1/1983 | Hendriks et al. | 366/338 X |

Primary Examiner—Barry S. Richman
Assistant Examiner—B. P. Heaney
Attorney, Agent, or Firm—Brady, O'Boyle & Gates

[57] ABSTRACT

Apparatus for producing an acid compound wherein an aqueous medium is pumped through a first reactor into which ammonia is injected. The first reactor comprises a venturi with a mixing deflector in the throat of the venturi. The ammonia is introduced to the first reactor via an inclined fitting proximate to the deflector. The aqueous ammonia medium is caused to flow through a second reactor downstream from the first reactor wherein sulfuric acid is injected and mixed with the aqueous ammonia medium resulting in an exothermic reaction between the ammonia and sulfuric acid under high temperatures and pressures. The sulfuric acid inlet of the second reactor comprises an inclined fitting which extends into the second reactor to form a baffle to facilitate mixing of the sulfuric acid and the aqueous ammonia mixture. The ammonia/sulfuric acid mixture then flows into a vat wherein the temperature and pressure of the compound are reduced. The acid compound is further cooled by causing the compound to flow from the vat to a cooling tower, the cooled acid compound then returning to the vat. A portion of the acid compound is continuously withdrawn from the vat and is employed as a portion of the aqueous medium flowing through the first reactor to thereby provide a closed loop system. Another portion of the acid compound is continuously withdrawn from the closed loop system as product which is subsequently placed in suitable containers.

3 Claims, 10 Drawing Figures

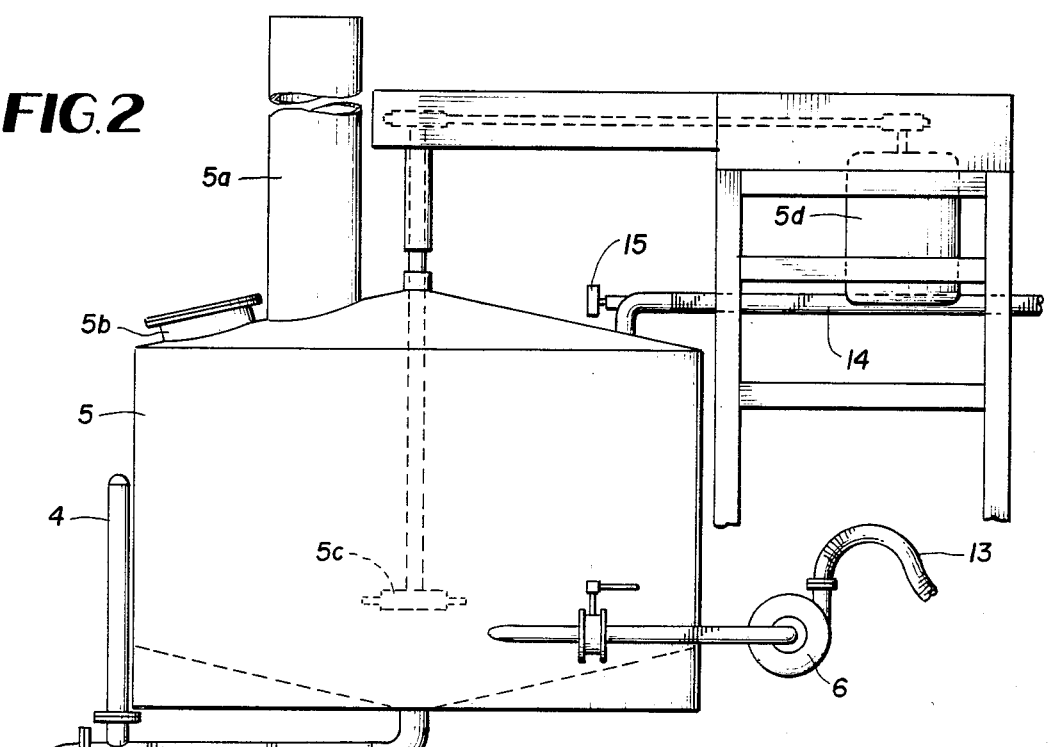
FIG.2
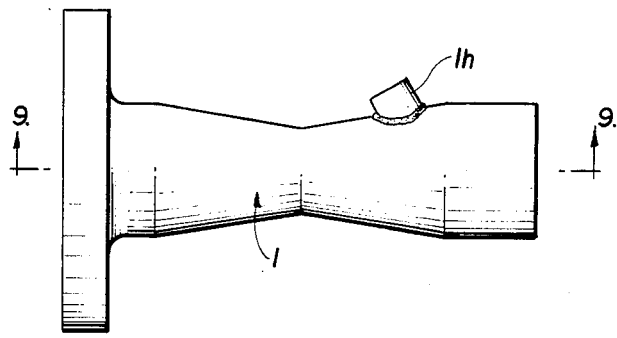
FIG.8
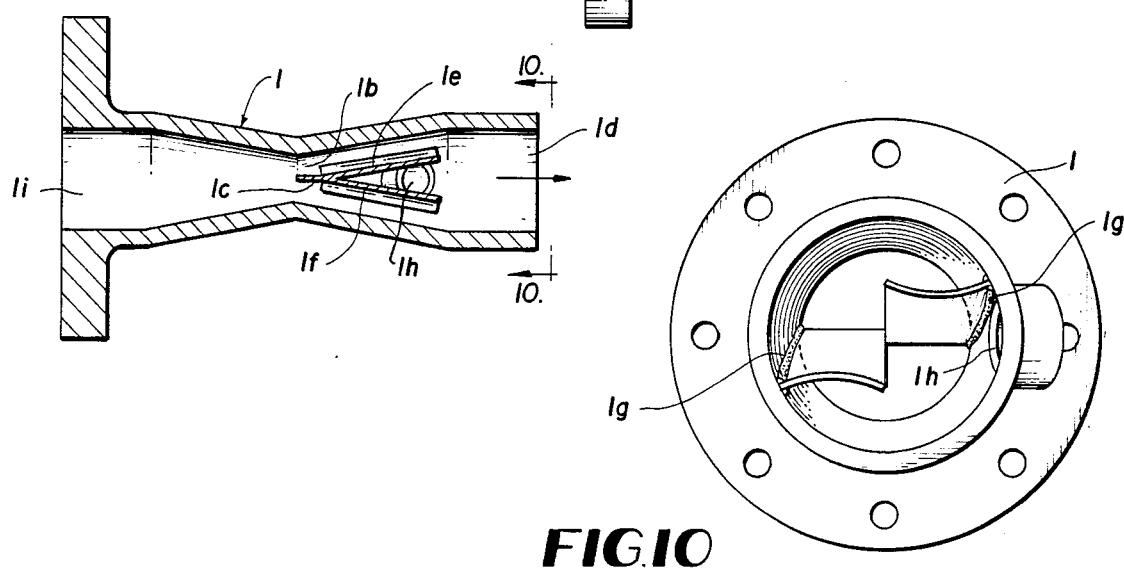
FIG.9
FIG.10

APPARATUS FOR PRODUCING AN ACID COMPOUND

CROSS-REFERENCE TO RELATED APPLICATION

Copending application Ser. No. 701,689, filed Feb. 14, 1985, which is a continuation of Ser. No. 523,144, filed Aug. 5, 1983, now abandoned and assigned to the same assignee as the instant application, discloses a method for producing a novel acid compound and the product produced thereby, whereas the instant application relates to the apparatus for carrying out the method of the invention described in the aforementioned pending application.

BACKGROUND OF THE INVENTION

The apparatus initially considered for producing the novel acid compound disclosed in my copending application was similar to the mixing apparatus disclosed in U.S. Pat. No. 4,208,375 to Max L. Bard dated June 17, 1980; however, after considerable research and experimentation, the Bard apparatus had to be modified and improved to obtain and withstand the temperatures and pressures during the reaction sequence and also the corrosive attack of the ammonia, sulfuric acid and aqueous reagents employed in producing the novel acid compound. More specifically, the apparatus of the present invention includes a first reactor having a venturi configuration. A rigid mixing deflector is mounted within the throat portion of the venturi and comprises a stem portion extending axially from the throat portion of the venturi toward the outlet thereof, the stem terminating in a pair of divergent fingers having an arcuate cross-section. The side wall of the venturi is provided with an inclined fitting through which ammonia is injected into the reactor in the vicinity of the divergent fingers.

A second reactor is provided downstream from the first reactor and comprises a titanium pipe having an inclined fitting extending through the side wall thereof. A portion of the inner end of the fitting extends into the pipe and forms a baffle to facilitate the injection of sulfuric acid through the fitting and the mixing thereof with the aqueous ammonia medium flowing from the first reactor. A shock absorber communicates with the second reactor to cushion the exothermic reaction between the ammonia and sulfuric acid.

The ammonia/sulfuric acid reaction mixture then flows to a vat similar to that disclosed in the aforementioned Bard patent wherein the pressure and temperature of the reaction medium are reduced.

A novel cooling tower is provided which communicates with the vat, whereby the acidic product from the vat can be further cooled and either recirculated to the vat or withdrawn from the system. The cooling tower includes a bundle of vertically extending tubes connected at each end to header plates, the connection of each tube to the respective header plate comprising a flared or expanded convex wall portion of the tube cooperating with a similarly configured concave groove formed in the header plate. The relatively hot acidic product is introduced into the lower end of the tube bundle through a pipe rigidly connected to the lower header plate and having a slip-joint O-ring seal assembly between the pipe and the end wall of the cooling tower housing through which cooling water circulates over the exterior of the tube bundle. The expansion joints between the tubes and header plates, and the slip-joint O-ring assembly facilitate the expansion and contraction of the cooling tower components during the process.

BRIEF DESCRIPTION OF THE DRAWINGS

FIG. 2 is a side elevational view of the first and second reactors and the vat;

FIG. 8 is a side elevational view of the first reactor;

FIG. 9 is a view taken along line 9—9 of FIG. 8; and

FIG. 10 is a view taken along line 10—10 of FIG. 9.

DESCRIPTION OF THE PREFERRED EMBODIMENT

Figure 1:
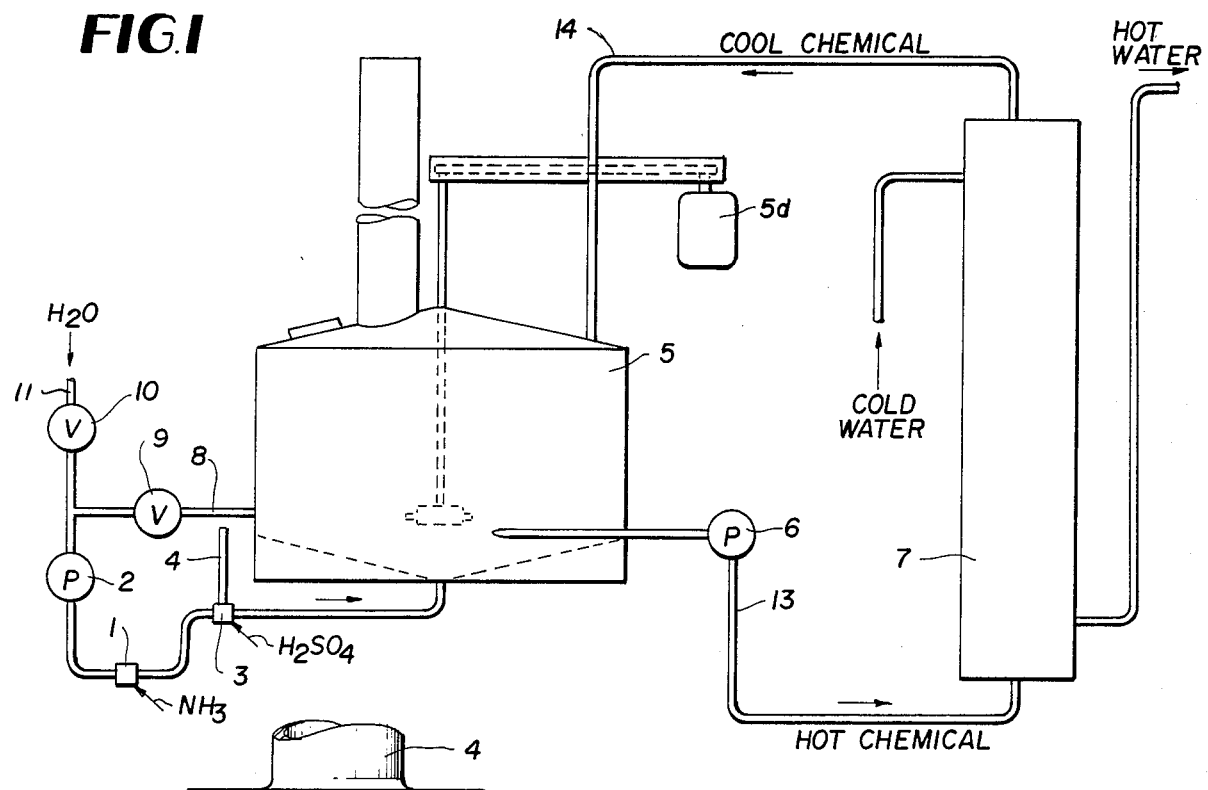
FIG. 1 is a diagrammatic view of the apparatus of the present invention, which includes the first and second reactors, the vat and cooling tower.

Referring to the drawings, and more particularly to FIG. 1 thereof, the apparatus of the present invention comprises essentially a first reactor 1 through which an aqueous medium is caused to flow from pump 2. Ammonia is injected into reactor 1 and is mixed with the aqueous medium. The aqueous ammonia medium then flows to a second reactor 3 into which sulfuric acid is injected resulting in an exothermic reaction between the ammonia and sulfuric acid. The exothermic reaction is cushioned by a shock absorber 4 communicating with the second reactor 3, the shock absorber comprising a vertically extending pipe closed at the upper end to thereby provide an air column. The ammonia/sulfuric acid reaction mixture then flows from the second reactor 3 into the bottom of a vat 5 similar to the vat disclosed in the aforementioned Bard patent, wherein the pressure and temperature of the mixture is reduced. The mixture is then removed from the vat by pump 6 and caused to flow through a cooling tower 7 wherein the temperature of the mixture is further reduced. From the cooling tower 7, the cooled mixture then flows back into the vat 5 to facilitate cooling the hot mixture entering the vat from the second reactor 3. A portion of the mixture can be removed from the vat 5 and containerized for use as a product, while another portion of the mixture can be removed from the vat through line 8 to be used as a portion of the aqueous medium flowing through the first reactor to thereby provide a closed loop system. Suitable valves 9 and 10 are provided in line 8 and water inlet pipe 11 to control the flow of aqueous medium into the first reactor 1 during the batch operation or continuous flow operation, to be described more fully hereinafter.

Referring to FIGS. 8, 9 and 10, the details of the construction of the reactor 1 are shown wherein it will be seen that the reactor is configured as a venturi having a mixing deflector rigidly mounted in the throat portion 1b thereof. The deflector comprises a stem portion 1c extending axially from the throat portion 1b of the venturi toward the outlet 1d thereof. The stem 1c terminates in a pair of divergent fingers 1e, 1f welded as at 1g to the interior side wall of the venturi, the fingers having an arcuate cross-section as seen in FIG. 10. An inclined fitting 1h is provided in the side wall of the venturi in proximity to the divergent fingers 1e, 1f, whereby ammonia is injected into the venturi and mixed with the aqueous medium flowing through the inlet 1i of the venturi.

Figure 6:
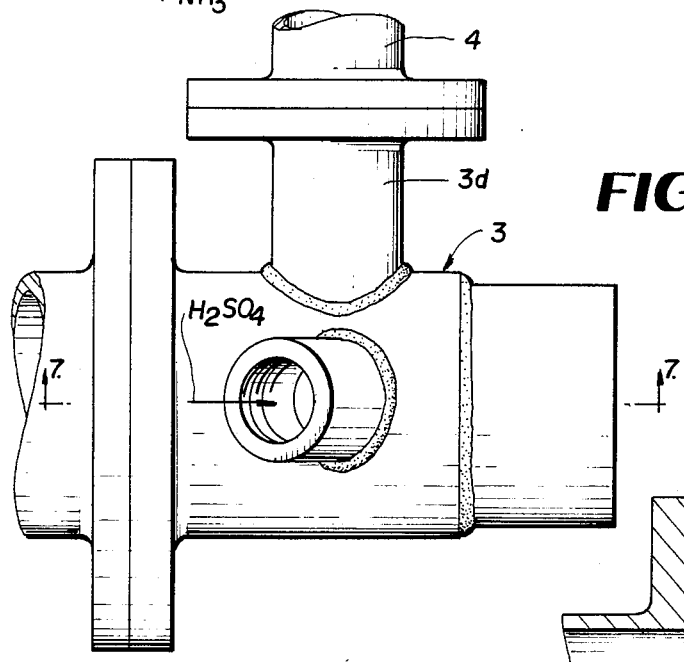
FIG. 6 is an enlarged, side elevational view of the second reactor.
Figure 7:
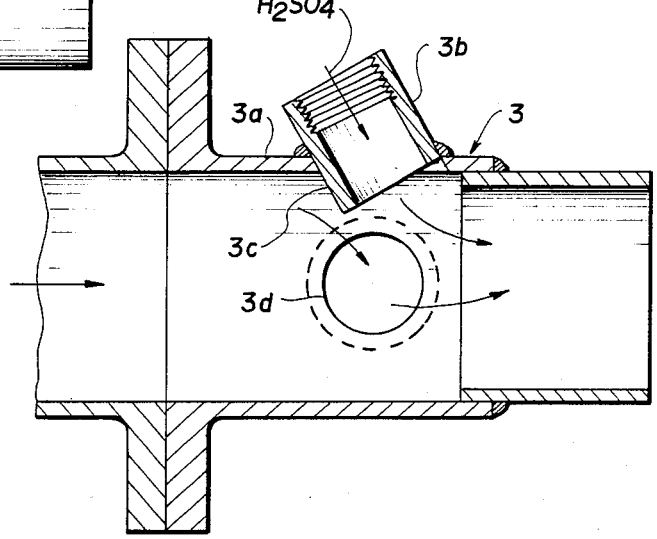
FIG. 7 is a view taken along line 7—7 of FIG. 6.

As will be seen in FIGS. 6 and 7, the reactor 3 comprises a titanium pipe 3a having an inclined fitting 3b welded to the side wall thereof, through which sulfuric acid is injected into the reactor and mixed with the aqueous ammonia mixture flowing through the reactor. A portion of the fitting 3b extends into the pipe 3a as at 3c to form a baffle to facilitate the mixing of the sulfuric acid and the aqueous ammonia mixture. The shock absorber 4 communicates with the pipe 3a as at 3d, whereby the exothermic reaction between the ammonia and sulfuric acid is cushioned.

Referring to FIG. 2, the second reactor 3 is connected to an expansible pipe 12 through which the ammonia/sulfuric acid reaction mixture flows into the bottom of vat 5 which includes an exhaust stack 5a, an inspection man hole 5b and a turbine agitator 5c driven by motor 5d, whereby the heat of reaction of the ammonia/sulfuric mixture is dissipated and a pressure barrier is created across the vat to combat high pressure from the expansible pipe 12. The relatively hot reaction mixture is removed from the vat 5 by pump 6 and fed through line 13 to the cooling tower 7 and the cooled acidic product is returned from the cooling tower to the vat through line 14 having a temperature gauge 15 at the outlet thereof.

Figure 3:
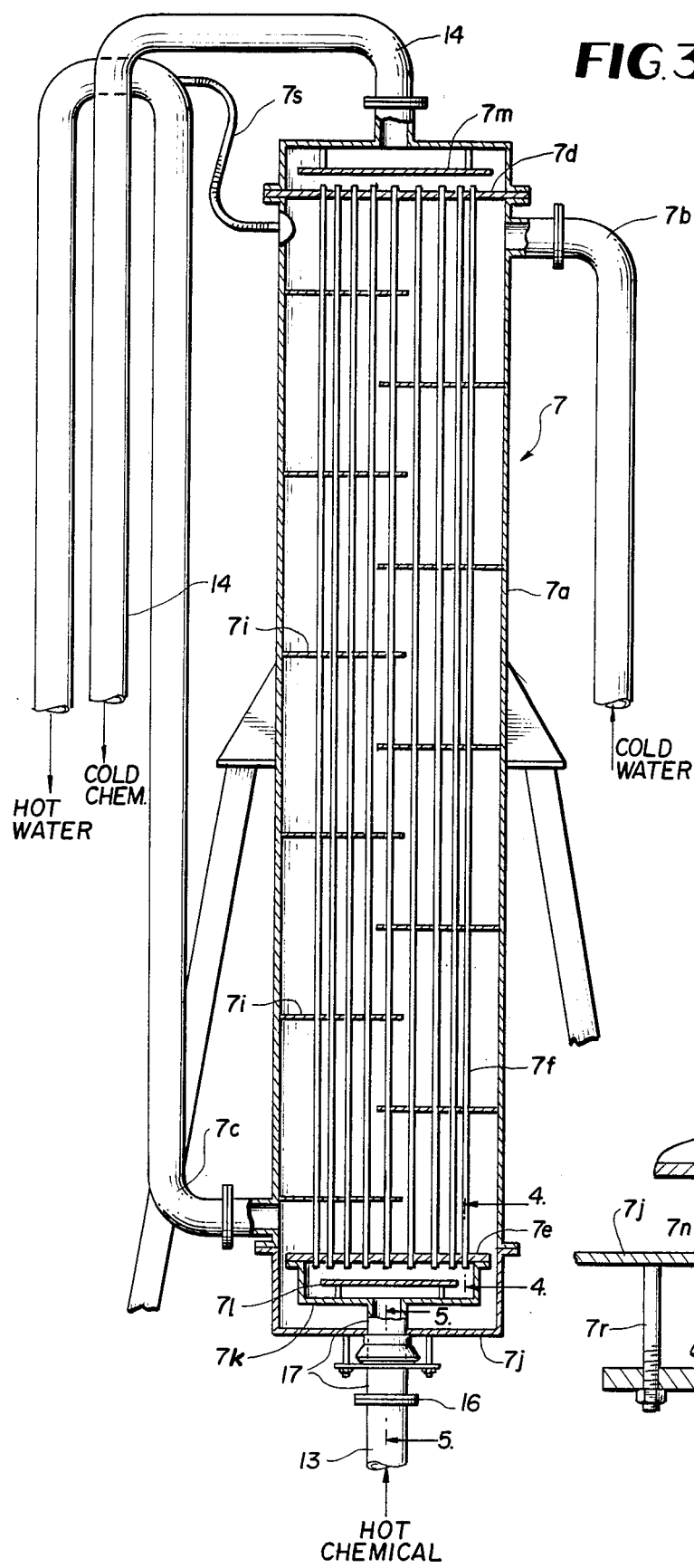
FIG. 3 is a sectional, side elevational view of the cooling tower.
Figure 4:
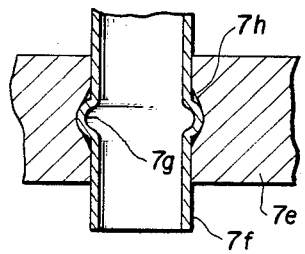
FIG. 4 is a view taken along line 4—4 of FIG. 3.
Figure 5:
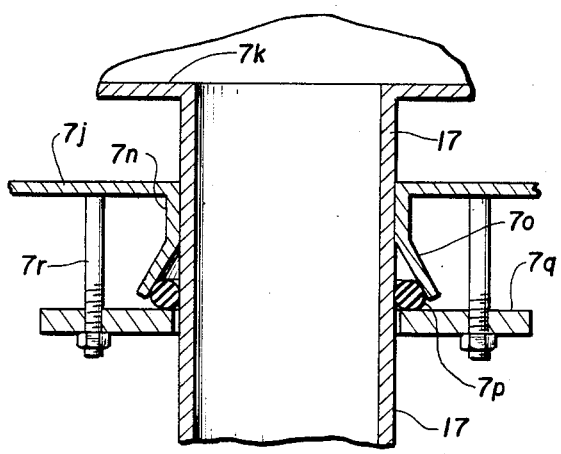
FIG. 5 is a view taken along line 5—5 of FIG. 3.

The details of the construction of the cooling tower 7 employed in the apparatus of the present invention are shown in FIGS. 3, 4 and 5 wherein it will be seen that the tower comprises a vertically extending housing 7a having a cold water inlet line 7b connected to the upper end of the housing and a hot water outlet line 7c connected to the lower end of the housing. Upper and lower header plates 7d, 7e are mounted within the housing and have a plurality of tubes 7f extending therethrough and mounted therein as shown in FIG. 4, each tube being flared or expanded as at 7g to form a convex wall portion cooperating with a similarly configured concave groove 7h formed in the header plate. The coolant water is caused to flow around the exterior of the tube bundle, the circulation thereof being enhanced by a plurality of transversely extending baffle plates 7i secured to the interior of the housing 7a.

The acidic product to be cooled is introduced into the bottom of the cooling tower 7 by pipe 13 connected as at 16 to a pipe 17 slidably mounted in the bottom wall 7j of the housing 7a. The pipe 17 is integrally connected to the end wall 7k of the header to thereby form an inlet for the hot acidic product into the tube bundle. A transversely extending baffle plate 7l is mounted in the header for evenly distributing the incoming hot acidic product upwardly into the tubes 7f. The upper header is similarly provided with a transversely extending baffle 7m for regulating the amount of flow evenly throughout all the cooling tubes 7f before discharge of the cooled product into pipe line 14.

As will be seen in FIG. 5, the bottom wall 7j of the housing is provided with a skirt portion 7n engaging the outer surface of inlet pipe 17, the lower end of the skirt portion having a flared portion 7o engaging an O-ring 7p supported on a collar 7q slidably mounted on the pipe 17 and held in an adjusted position thereon by bolt and nut assemblies 7r depending from the wall 7j and connected to the collar. By this construction and arrangement, a seal is not only formed to prevent leakage of the cooling water from the tower but also a slip joint is provided to allow sliding movement of the pipe 17 caused by contraction and expansion of the assembly during the process. The connection of the tubes with the header plates as shown in FIG. 4 also allows for expansion and contraction of the tubes.

To complete the structure of the cooling water, an air bleed-off line 7s is connected between the upper end of the tower and the hot water discharge line 7c for bleeding air pressure from the top of the cooling tower.

In the initial operation of the apparatus of the present invention a batch of the product is first produced by closing valve 9 and opening valve 10 to allow 5000 lbs. of $H_2O$ (50° F.) to be pumped through the reactors 1 and 3 into which $NH_3$ and $H_2SO_4$ are injected as fast as possible so as to bring the temperature of the vat 5 up to approximately 200° F. within 3 to 5 minutes. During this time, the ratio of $H_2SO_4$ to $NH_3$ is 6.34 parts of $H_2SO_4$ by weight to 1 part by weight of $NH_3$. 2623–2700 pounds of $H_2SO_4$, 385–395 pounds of $NH_3$ and additional water at a ratio of 1 part $NH_3$ to 6.34 parts $H_2SO_4$ to 9.24 parts are injected into the system whereby the reaction temperature in reactor 3 is raised to between 1059° F. to 1150° F. When 5000 pounds of finished product is obtained in the vat 5, valve 9 is opened and valve 10 is adjusted for continuous flow operation.

During the continuous flow operation, a portion of the acidic product is continuously withdrawn from vat 5 and is recirculated through the reactors 1 and 3 as the aqueous medium. Water, ammonia and sulfuric acid are separately injected into the system in amounts sufficient to maintain a reaction temperature and pressure in reactor 1 of 50 to 55 psi at 350° F. and a reaction temperature in reactor 3 of approximately 1100° F. The product is removed from the vat 5 and circulated through the cooling tower 7 wherein the temperature of the product is lowered to about 80° F. before returning to the vat to aid in maintaining the temperature of the reaction medium in the vat below about 230° F., preferably between 200° F. and 210° L F.

A portion of the cooled product is removed from the system and containerized for use as a metal cleaner, electrolyte, etching agent, plating media, soil enhancer and the like.

It is to be understood that the form of the invention herewith shown and described is to be taken as a preferred example of the same, and that various changes in the shape, size and arrangement of parts may be resorted to, without departing from the spirit of the invention or scope of the subjoined claims.

I claim:

1. Apparatus for producing an acid compound comprising: a first reactor having a first inlet through which an aqueous medium is pumped, a second inlet through which ammonia is injected and an outlet, said first reactor comprising, a venturi section having a mixing deflector rigidly mounted in the throat portion thereof, said mixing deflector comprising a stem portion extending axially from the throat portion of the venturi section toward the outlet thereof, said stem terminating in a pair of divergent fingers secured to the interior side wall of said venturi section, said fingers having an arcuate cross-section, said first inlet of the first reactor communicating with the upstream side of said venturi section, said second inlet of the first reactor comprising an inclined fitting secured to the side wall of the venturi section in proximity to the divergent fingers, said outlet of the first reactor communicating with the downstream side of said venturi section whereby ammonia is injected into the venturi section through said second inlet of the first reactor and mixed with the aqueous medium flowing through the first inlet of the first reactor and into the venturi section resulting in a reaction temperature of approximately 350° F. and forming an aqueous ammonia mixture; a second reactor comprising a pipe having a first inlet communicating with the outlet of the first reactor, a second inlet through which sulfuric acid is injected and an outlet, said second inlet of the second reactor comprising an inclined fitting secured to the side wall of said pipe, a portion of said fitting extending into said pipe to form a baffle to facilitate the mixing of the sulfuric acid and the aqueous ammonia mixture resulting in an exothermic reaction temperature of approximately 1100° F., to thereby form an acidic compound; a vat having a top portion and a bottom portion, the outlet of said second reactor communicating with the bottom portion of said vat; a cooling tower comprising a housing having a top portion and a bottom portion; a first communicating means connecting to the bottom portion of said vat and the bottom portion of said cooling tower for conveying the hot acidic compound from the bottom of the vat to the bottom of said cooling tower; and a second communicating means connected to the top portion of said cooling tower and the top portion of said vat for returning cooled acidic compound from the cooling tower to the vat to maintain the acidic compound in the vat at approximately 200° F.

2. Apparatus according to claim 1, wherein the pipe of the second reactor is constructed of titanium.

3. Apparatus according to claim 1, wherein said first communicating means comprises a hot acidic product inlet pipe, said second communicating means comprises a cooled acidic product outlet pipe, said housing of said cooling tower extending vertically, and said cooling tower further comprising; a cold water inlet connected to the top portion of said housing, a hot water outlet connected to the bottom portion of said housing, an upper header having an upper header plate and mounted in said top portion of said housing, a lower header having a lower header plate and mounted in said bottom portion of said housing, a plurality of cooling tubes extending between said upper and lower header plates and mounted therein, each of said tubes having expanded regions forming a convex wall portion which copperate with similarly configured concave wall portions within each of said header plates, said hot acidic product inlet pipe connected to said lower header to introduce hot acidic product into said plurality of tubes, said cooled acidic product outlet pipe connected to said upper header for discharging cooled acidic product from said plurality of tubes, a plurality of horizontal baffles secured to the interior of said housing between said upper and lower header plates defining a cooling water flow path and enhancing the circulation of cooling water around the exterior of said plurality of tubes, a lower horizontal baffle mounted in said lower header for evenly distributing the hot acidic product, an upper horizontal baffle mounted in said upper header for regulating the amount of cooled acidic product flow evenly throughout all of said plurality of tubes before being discharged into said product outlet pipe, a depending skirt portion located at the bottom portion of said housing and engaging the outer surface of said product inlet pipe, a collar mounted on said product inlet pipe below said skirt portion having means for permitting slidable movement of said product inlet pipe therethrough, an O-ring supported on said collar and mounted on said product inlet pipe, a flared section of said skirt portion engaging said O-ring, and nut and bolt assemblies extending from said bottom portion of said housing and through said collar for holding said O-ring against the flared section of said skirt portion.

* * * * *